(12) United States Patent
Westman

(10) Patent No.: US 7,162,202 B2
(45) Date of Patent: Jan. 9, 2007

(54) CREATING USER GROUPS IN MOBILE TERMINAL COMMUNITIES

(75) Inventor: Ilkka Westman, Helsinki (FI)

(73) Assignee: Nokia Corporation, Espoo (FI)

( * ) Notice: Subject to any disclaimer, the term of this patent is extended or adjusted under 35 U.S.C. 154(b) by 521 days.

(21) Appl. No.: 10/606,287

(22) Filed: Jun. 26, 2003

(65) Prior Publication Data

US 2004/0082351 A1 Apr. 29, 2004

(30) Foreign Application Priority Data

Jun. 28, 2002 (GB) .................... 0215012.6

(51) Int. Cl.
*H04Q 7/20* (2006.01)

(52) U.S. Cl. .................. 455/41.2; 455/518; 455/456.1; 455/435.1; 455/463

(58) Field of Classification Search .......... 455/41.1–3, 455/462, 465, 517–9, 422.1, 435.1, 456.1–6; 370/312, 338; 375/132; 709/229, 223
See application file for complete search history.

(56) References Cited

U.S. PATENT DOCUMENTS

| | | | |
|---|---|---|---|
| 6,754,250 B1 * | 6/2004 | Haartsen | ..................... 375/132 |
| 6,754,470 B1 * | 6/2004 | Hendrickson et al. | .................... 455/456.1 X |
| 6,820,126 B1 * | 11/2004 | Sibecas et al. | .............. 709/229 |
| 2001/0027111 A1 | 10/2001 | Motegi et al. | .............. 455/519 |
| 2003/0036350 A1 * | 2/2003 | Jonsson et al. | ............... 455/41 |
| 2003/0177219 A1 * | 9/2003 | Taib et al. | .................. 709/223 |

FOREIGN PATENT DOCUMENTS

| | | |
|---|---|---|
| EP | 1 128 597 A1 | 8/2001 |
| EP | 1 158 820 A1 | 11/2001 |
| EP | 1 176 840 A1 | 1/2002 |
| GB | 2 358 110 A | 7/2001 |
| GB | 2 365 263 A | 2/2002 |
| GB | 2 373 678 A | 9/2002 |
| GB | 2 380 365 A | 4/2003 |
| WO | WO 01/39443 A1 | 5/2001 |

* cited by examiner

*Primary Examiner*—Matthew D. Anderson
*Assistant Examiner*—Philip J. Sobutka
(74) *Attorney, Agent, or Firm*—Squire, Sanders & Dempsey LLP

(57) ABSTRACT

There is disclosed a method of establishing a user group amongst a plurality of mobile terminals, comprising: receiving at a host device, from at least one of the plurality of mobile terminals, an identity associated with each of said mobile terminals; and grouping or collecting, at the host device, the identities associated with the mobile terminals, to thereby establish a user group, wherein the at least one said mobile terminal transmits said associated identities to the host device on a local communication link.

29 Claims, 2 Drawing Sheets

CREATING USER GROUPS IN MOBILE TERMINAL COMMUNITIES

FIELD OF THE INVENTION

The present invention relates to the provision of user groups for mobile terminals, and particularly but not exclusively to the provision of temporary user groups in localized areas.

BACKGROUND TO THE INVENTION

The creation of user groups, sometimes referred to as buddy lists, is well known. In the art of computer networking, user groups provide for services such as instant messaging.

It has been proposed that such user groups may be provided for in mobile communications networks, to provide user groups between users of terminals in the network. Given the nature of mobile communications networks, it has been proposed that it would be advantageous to create temporary user groups, where users that are temporarily located in a particular local area, such as attending a conference, may be brought together in a temporary user group.

Such proposed techniques rely upon network location algorithms in the mobile communications network in order to determine the locations of mobile terminals, and then provide information to a conference provider or such like that pays the mobile communications network service for the identities of the mobile terminals in the conference area.

It is an aim of the present invention to provide an improved technique for creating user groups in mobile terminal communities, and particularly for creating temporary user groups.

SUMMARY OF THE INVENTION

According to the present invention there is provided a method of establishing a user group amongst a plurality of mobile terminals, comprising: receiving at a host device, from at least one of the plurality of mobile terminals, an identity associated with each said mobile terminal; and grouping or collecting, at the host device, the identities associated with the mobile terminals, to thereby establish a user group, wherein the said at least one mobile terminal transmits the said associated identities to the host device on a local communication link.

Preferably the user group is a temporary user group.

The host device is preferably associated with a mobile communications network, the method further comprising the step of transmitting the user group to the mobile communications network. The mobile communications network may further communicate with the mobile terminals in the user group.

The method may further comprise dynamically updating the user group. The step of dynamically updating the user group may include receiving, at the host device, an identity associated with a mobile terminal, and adding said identity to the user group. The step of dynamically updating the user group may further include deleting an identity from the user group.

The method may further comprise storing the user group. The user group may be stored with a characteristic to identify the group. The characteristic may be at least one of a date stamp; a time stamp; a location stamp.

The plurality of mobile devices may transmit their associated identities to the host device responsive to a request for their associated identity from the host device, wherein the host device transmits said request on a local communication link. The request from the host device may be a broadcast signal.

The host device may include a mobile terminal.

The method may further comprise the step, after said grouping step, of transmitting the identities of the user group to the plurality of terminals.

The local communication link may be a short-range communication link. The short-range communication link may be a radio communication link. The radio communication link may be a Bluetooth link.

Each of the plurality of mobile terminals may be associated with a mobile telecommunications network.

The host device may be a mobile terminal. The host device may be a dedicated control unit. The host device may be a computer.

According to a further aspect of the present invention there is further provided a device for establishing a user group amongst a plurality of mobile terminals, including: means for receiving an identity associated with each of the mobile terminals, said means being adapted to receive the identities on a local communication link; and means for grouping or collecting the associated identities to thereby establish a user group.

The local communication link may be a short-range communication link. The short range communication may be a radio link. The radio link may be a Bluetooth link. The short range communication link may be an infra-red link.

The device may further include means for communicating with a mobile communication system, and means for transmitting the user group to said mobile communication system. The device may further comprise means for storing one or more user groups.

The device may comprise a mobile telephone, a host control device, or a computer system.

In a still further aspect the present invention provides a mobile communications system including a device for establishing a user group amongst a plurality of mobile terminals of the system, including a host device for receiving an identity associated with each of the mobile terminals, said host device being adapted to receive the identities on a local communication link, and said host device further being adapted to group or collect the associated identities to thereby establish a user group.

BRIEF DESCRIPTION OF THE DRAWINGS

The invention will now be described by way of example with reference to the accompanying drawing, in which.

DESCRIPTION OF PREFERRED EMBODIMENTS

The present invention is described herein with reference to a particular example. However it will be understood by one skilled in the art that the invention is not limited to the example given, and may be more broadly applied.

For the purposes of describing an example to understand the present invention, an example is given of creating a temporary user group, or buddy list, in a conference environment.

Figure 1:
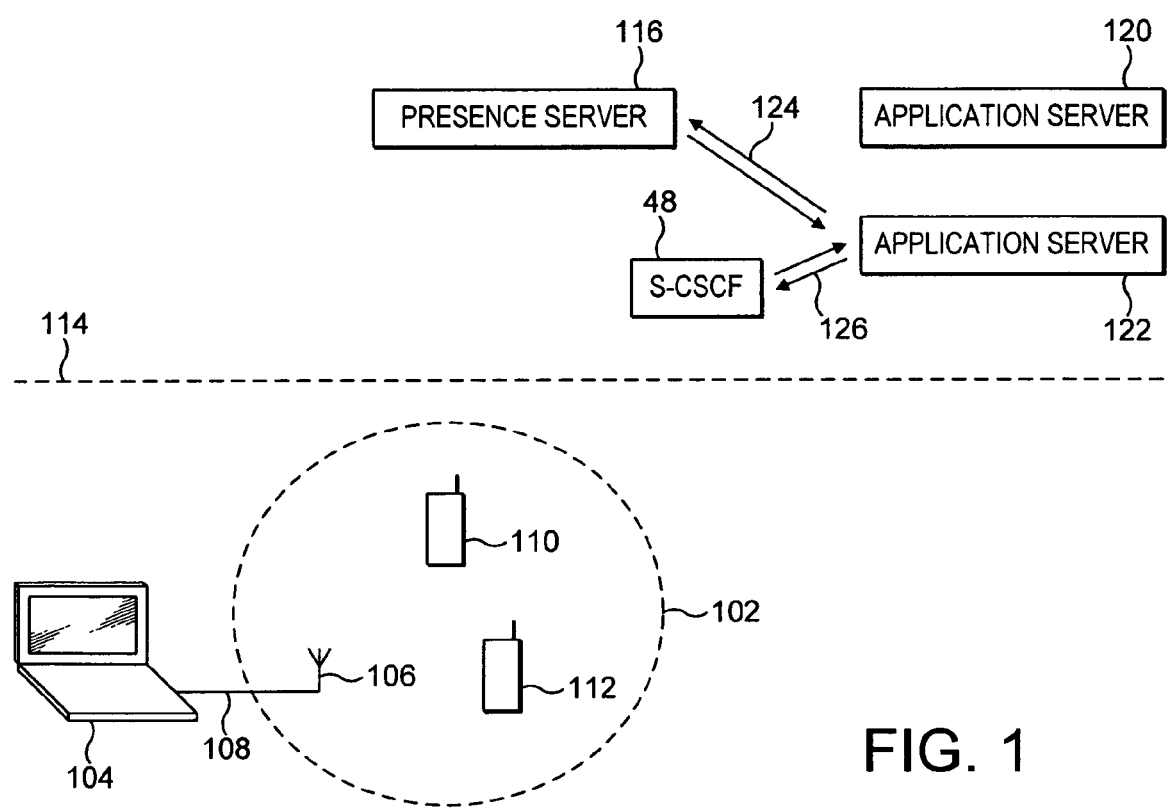
FIG. 1 illustrates an example scenario in which the present invention may be implemented.

Referring to FIG. 1, the conference environment is generally designated by the dashed area 102. The area 102 represents a physical area within which the conference is being held, such as a hotel complex, and more particularly a room of the hotel complex.

The conference provider, wishing to establish a temporary user group amongst attendees of the conference, has a computer terminal 104 which is connected via communication lines 108 to a local transmitter/receiver 106. In this preferred embodiment, the local transmitter/receiver 106 is a Bluetooth transmitter/receiver, transmitting and receiving radio signals over a short distance in a localized area, i.e. the area 102 of the conference. Whilst a Bluetooth link is proposed in this exemplary embodiment, in general a short range or local communication link is used. More generally, the invention advantageously uses a communication link not requiring access to a wireless network infrastructure of a mobile communication system. In a particularly preferred embodiment, the transmitter/receiver 106 is provided in a doorway through which attendees enter the conference.

For the purposes of the present invention, it is assumed that attendees have a mobile terminal such as a mobile telephone. For the sake of example two mobile terminals 110 and 112 are shown in FIG. 1 in the conference area. However in practice a larger number of mobile terminals may be provided.

Each of the mobile terminals is associated with a mobile communications network, preferably an intelligent network. That is, each of the mobile terminals 110 and 112 is ordinarily connected in a mobile network for the purpose of making and receiving calls, and possibly for the purposes of data transfer. In FIG. 1 there is shown, above the dashed line 114, elements of a mobile communication network such as which the terminals 110 and 112 may be connected in. A detailed explanation of such network, or of the connections of the terminals 110 and 112 in such network, is outside the scope of the present invention and will be familiar to one skilled in the art.

In brief, a serving call state control function (S-CSCF) 118 associated with, for example, the mobile terminal 110 provides services associated with an application server 122 via communication links 126. Other services may be provided by other application servers, such as 120. The application server 122 offers services which need presence information, and obtains presence information from a presence server 116 via communication lines 124. The presence server stores information, e.g. the identity, concerning the mobile terminals present in the network. It also stores information about who is allowed to access the presence information. If the presence server has not previously needed this information it may fetch it from one or more other servers.

In accordance with the present invention, each of the mobile terminals 110 and 112 is provided with an additional communication link, additional to the communication links to the mobile communication network with which it is associated, which is compatible with the communication link provided by the transmitter/receiver 106.

In the preferred embodiment, the communication links of the mobile terminals 110 and 112 are open to receive broadcast messages from the transmitter/receiver 106. In the example of FIG. 1, the computer controls the transmitter/receiver 106 to broadcast a registration request. On entering the conference room, or in being present in the conference room, the terminals 110 and 112 receives the registration request signal on their local communication link.

Provided that the mobile terminals 110 and 112 are configured by their users to respond to such a request, then the mobile terminals 110 and 112 respond to the registration request by providing identification information to the computer 104 via the transmitter/receiver 106.

In this way, the computer groups or collects information as to the identity of the mobile terminals present at the conference. The mobile terminals may return the identity to the computer 104 as the number associated to the mobile telephone, as a user identity of the mobile communication network, as the unique network identification code (IMEI number) or other information.

In a preferred embodiment, the mobile terminals respond to the registration request with the number associated with the mobile terminal. Thereafter, the computer 104 groups or collects a user group consisting of all users who have registered, and possibly transmits the group back to the mobile terminals 110 and 112 using the local communication link. Thereby a user group is quickly and simply created without any need for network communication. Avoiding network access to create a user group in this way minimizes costs.

In an embodiment, the information provided to the computer 104 may be edited before creation of the user group, or multiple user groups may be created, or new information may be merged to an existing group. For example, multiple user groups may be created according to identification information provided by the mobile terminals. Such information may be pre-stored in the mobile terminals or on one or more chips or such like that can be inserted in the mobile terminal and may include the identity of the user's specific interests. Such information may also be obtained at the registration by asking one or more questions, and thus the user's answers could be obtained.

In a further embodiment, the user group or groups is/are grouped or collected by the computer 104 and not transmitted to the mobile terminals, but rather used by the computer 104 to transmit specific information such as announcements by way of local broadcasts using the transmitter/receiver 106.

In a further embodiment, the computer 104 may have a connection to a mobile communication network (not shown). Such connection may be via fixed landlines, or via a mobile terminal connection. In such embodiment the computer may transmit the grouped or collected user group list to the network, and the network may use that information to provide networks services to the mobile terminals identified in the group that are specific to the conference. That may be particularly advantageous where the local communication link is used to detect the presence of a user, for instance as they enter a doorway, but where the local communication link is not powerful enough to communicate with the user thereafter. It is also advantageous if the group is used e.g. for sending a message, advertisement or such like to the members of the conference after it has finished.

The user groups may be dynamically updated based on new mobile terminals entering the area 102. The list may be dynamically updated by deleting mobile terminals which leave the area 102. For example if the transmitter/receiver 106 is in a doorway, the mobile terminal may send a local communication signal as the user leaves a room. Alternatively the computer may periodically update the list, if the local link is powerful enough, by requesting the mobile terminals to confirm their presence.

The computer 104 may also not only keep a user group of who is currently at the conference, but also keep a user group of who has been at the conference today, in the last week etc. The computer or a mobile terminal may then continue to provide those mobile terminals with services via the mobile communication network in which they are normally connected. For example, the computer or a mobile terminal could send SMS messages to the mobile terminals in the group.

Whilst the present invention has been described hereinabove by way of reference to a conference example, it is more generally applicable. For example the invention may be utilized in a restaurant. The owner of a restaurant may then, for example, be able to access a user group of everyone who was in the restaurant on Wednesday night, to notify them of a special offer, e.g. by text message, the next Wednesday night.

Thus, user groups maybe stored with a characteristic to identify the group, such as a date stamp, a time stamp, a location stamp, for future use.

Furthermore, the functionality of the local transmitter/receiver 106, and computer 104, may not be provided by a fixed transmitter/receiver and a computer. Alternatively they may be simply provided by a further mobile terminal.

For example, if a group of users with mobile terminals are in a room, a first user may select a menu option on their mobile terminal to create a temporary user group or buddy list. Responsive thereto, the mobile terminal sends an optional registration request on a local transmission link, which is received by all mobile terminal within range of the local transmission link. The user of any such mobile terminal may then make a selection on the menu on the mobile terminal to send their identification to the first user, e.g. by selecting a send public user identity button on the screen.

The first user then groups or collects the user group based on the replies, and optionally transmits it to all the other users. In this way a user group is simply created on a single mobile terminal, and then provided to all mobile terminals. Each individual user may then send the user group list to their mobile network for use e.g. by the presence and/or message and/or group and/or similar servers therein to provide user group services.

It should be noted that the creation of the user group does not require any network access, and therefore does not require the mobile terminals to be connected in the mobile communication network.

The local transmission link is preferably any short range communication link, for example a Bluetooth link, an infrared link, or other short-range media. However, any appropriate transmission link may be used.

Figure 2:
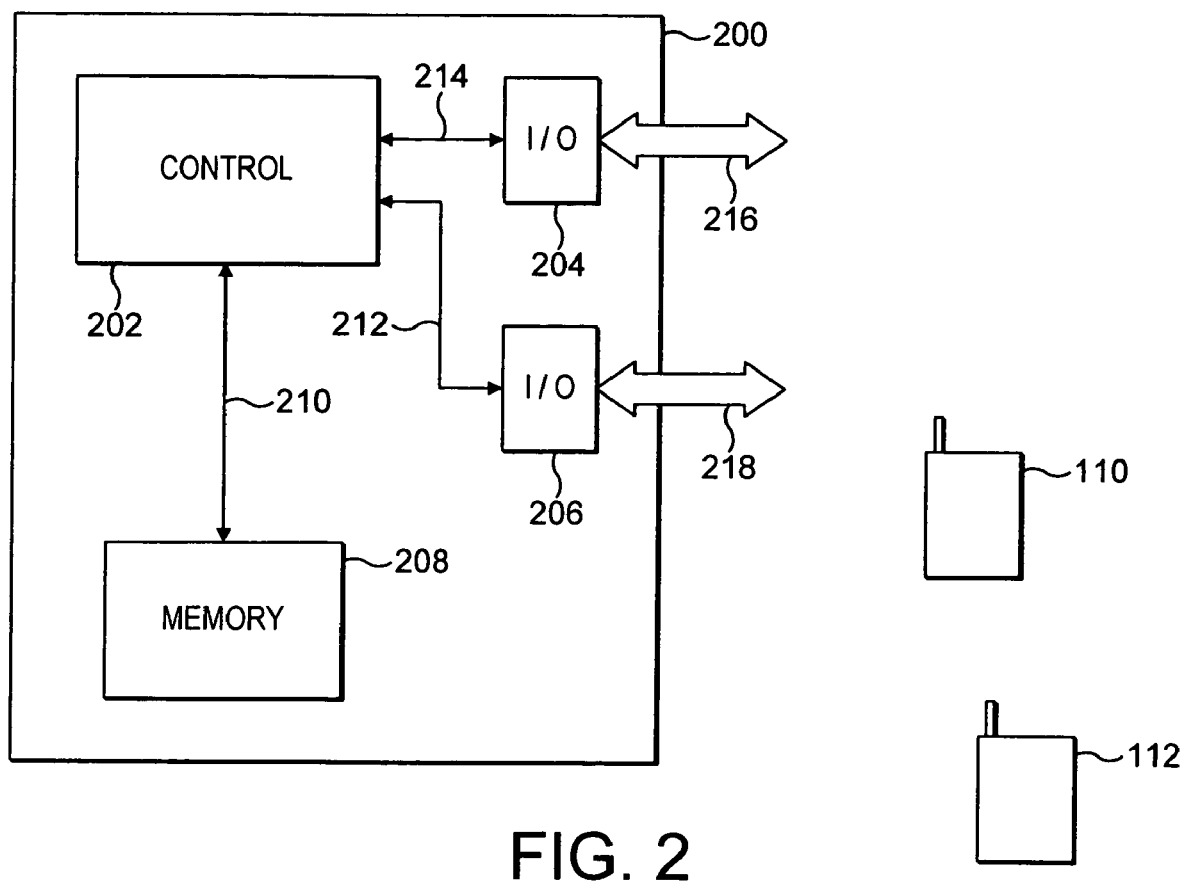
FIG. 2 illustrates the main elements of a host device for implementing the invention.

Referring to FIG. 2, there is illustrated in block diagram form an example of a host device for implementing the present invention. The example host device is generally illustrated by reference numeral 200, and includes a control block 202, a memory block 208, a first input/output device 204 and a second input/output device 206.

The first input/output device 204 is preferably a communication device for communicating with a mobile communications network, as described in embodiments hereinabove. Thus the first input/output device maybe a GSM, GPRS, UMTS compatible communication device, for example. The first input/output device 204 communicates with the mobile communications network (not shown) via communications link 216.

The second input/output device 206 is preferably a Bluetooth communication device, for communicating with the mobile terminals, such as terminals 110 and 112, in the local area. The second input/output device 206 communicates with the mobile devices via a Bluetooth link 218. As discussed hereinabove, the input/output device 206 may in fact support different short-range communications.

The control block 202 controls the host device to perform the techniques of the present invention as described hereinabove. The memory 208 stores the user groups created by the host device. As discussed hereinabove, the memory may store a plurality of user groups, preferably corresponding to past user groups, as well as any current user groups.

The control block controls access to memory 208 via lines 210. The control block further controls the first input/output device 204 via control lines 214, and the second input/output device via control lines 212.

The host device 200 maybe implemented as a dedicated control device. Alternatively the host device may be a mobile terminal such as a mobile telephone. In such case the input/output blocks 204 and 206 are provided by the normal communication means of the terminal. Similarly the control block 202 and the memory 208 maybe implemented using the normal components of the terminal. In a further alternative, the host device may be implemented in a computer system, or a computer system associated with a mobile telephone. Such a computer system may, for example, be PDA.

Whilst the invention has been described herein with reference to particular examples, it will be apparent to one skilled in the art how the invention may be more broadly applied. The scope of the invention is determined by the appended claims.

The invention claimed is:

1. A method of establishing a user group amongst a plurality of mobile terminals, comprising:
   receiving at a host device, from at least one of a plurality of mobile terminals, at least one identity associated with each said mobile terminal;
   grouping and collecting, at the host device, the identities associated with the mobile terminals, to thereby establish a user group, wherein each of the at least one of said mobile terminals transmits its associated identity to the host device on a local communication link, wherein the host device is associated with a mobile communications network;
   transmitting the user group to the mobile communications network; and
   providing services to the mobile terminals of the user group from the mobile communications network once the local communications link is no longer powerful enough to communicate with those terminals.

2. A method according to claim 1 wherein the user group is a temporary user group.

3. A method according to claim 1 wherein the host device includes a mobile terminal.

4. A method according to claim 1 further comprising the step, after said grouping step, of transmitting the identities of the user group to the plurality of terminals.

5. A method according to claim 1 wherein each of the plurality of mobile terminals is associated with a mobile telecommunications network.

6. A method according to claim 1 wherein the host device is a mobile terminal.

7. A method according to claim 1 wherein the host device is dedicated control unit.

8. A method according to claim 1 wherein the host device is a computer.

9. A method according to claim 1, further comprising dynamically updating the user group.

10. A method according to claim 9 wherein the step of dynamically updating the user group includes receiving, at the host device, at least one identity associated with a mobile terminal, and adding said identity to the user group.

11. A method according to claim 9 wherein the step of dynamically updating the user group includes deleting an identity from the user group.

12. A method according to claim 1, further comprising storing the user group.

13. A method according to claim 12 wherein the user group is stored with a characteristic to identify the group.

14. A method according to claim 13 wherein the characteristic is at least one of a date stamp; a time stamp; a location stamp.

15. A method according to claim 1 wherein the plurality of mobile devices transmit their associated identities to the host device responsive to a request for their associated identity from the host device, wherein the host device transmits said request on a local communication link.

16. A method according to claim 15 wherein the request from the host device is a broadcast signal.

17. A method according to claim 1 wherein the local communication link is a short-range communication link.

18. A method according to claim 17 wherein the short-range communication link is a radio communication link.

19. A method according to claim 18 wherein the radio communication link is a Bluetooth link.

20. A device for establishing a user group amongst a plurality of mobile terminals, including:
   means for receiving an identity associated with each of the mobile terminals, said means being configured to receive the identities on a local communication link;
   means for grouping or collecting the associated identities to thereby establish a user group;
   means for transmitting the user group to a mobile communications network; and
   means for providing services to the mobile terminals of the user group from the mobile communications network once the local communications link is no longer powerful enough to communicate with those terminals.

21. A device according to claim 20 further comprising means for storing one or more user groups.

22. A device according to claim 20 comprising a mobile telephone.

23. A device according to claim 20 comprising a host control device.

24. A device according to claim 20 comprising a computer system.

25. A device according to claim 20 wherein the local communication link is a short-range communication link.

26. A device according to claim 25 wherein the short range communication link is an infra-red link.

27. A device according to claim 25 wherein the short range communication is a radio link.

28. A device according to claim 27 wherein the radio link is a Bluetooth link.

29. A mobile communications system including a device for establishing a user group amongst a plurality of mobile terminals of the system, including:
   a host device for receiving an identity associated with each of the mobile terminals, said host device being configured to receive the identities on a local communication link, and said host device further being configured to group or collect the associated identities to thereby establish a user group, wherein the host device is associated with a mobile communications network,
   wherein the system is configured to transmit the user group to the mobile communications network; and to provide services to the mobile terminals of the user group from the mobile communications network once the local communications link is no longer powerful enough to communicate with those terminals.

* * * * *